United States Patent [19]

Ehsanipour

[11] 4,443,198
[45] Apr. 17, 1984

[54] FOLDING BOARD FOR PAMPHLETS, MAPS AND THE LIKE

[76] Inventor: Kamran Ehsanipour, 212 Stanley Rd., Burlingame, Calif. 94010

[21] Appl. No.: 364,769

[22] Filed: Apr. 2, 1982

Related U.S. Application Data

[63] Continuation-in-part of Ser. No. 170,136, Jul. 18, 1980, Pat. No. 4,360,346.

[51] Int. Cl.³ .............................................. G09B 29/10
[52] U.S. Cl. ..................................... 434/153; 281/31; 283/34; 16/355
[58] Field of Search ................... 434/153, 150, 81, 85; 273/285, 286; 281/31; 283/34, 35; 206/1.7; 40/530; 16/128 R

[56] References Cited

U.S. PATENT DOCUMENTS

| | | | |
|---|---|---|---|
| 52,891 | 2/1866 | Schaefer | 273/285 |
| 512,882 | 1/1894 | Hillhouse | 283/34 |
| 827,670 | 7/1906 | Russell | 273/286 X |
| 1,110,217 | 9/1914 | Maull | 434/153 X |
| 1,110,901 | 9/1914 | Cowles | 434/153 X |
| 1,276,657 | 8/1918 | Ibanez | 434/153 |
| 1,526,044 | 2/1925 | Blake | 281/31 X |
| 2,789,372 | 4/1957 | Ribak | 434/153 |
| 4,360,346 | 11/1982 | Ehsanipour | 434/153 |

FOREIGN PATENT DOCUMENTS 677952  3/1930  France ............................. 283/34

*Primary Examiner*—William H. Grieb
*Attorney, Agent, or Firm*—Julian Caplan

[57] ABSTRACT

A folding board used as a backing for pamphlets, maps and graphic and printed material consists of four or more sections. Three sections are hinged together along the lengths of abutting edges; the fourth is hinged to one section along the length of an edge abutting one other section, but disconnected along the length of another such edge except by a fourth hinge. The sections are folded flat against each other along three hinges. The fourth hinge has its axis above the place of two sections to permit flat folding of all sections. Various types of hinges are disclosed. How more than four rectangular sections may be hinged together is disclosed. Illumination means for the board and compass to be used with a map on the board are shown and described. Various scales for locating the coordinates for a map may be used. One such scale is hinged; another is telescopic.

16 Claims, 25 Drawing Figures

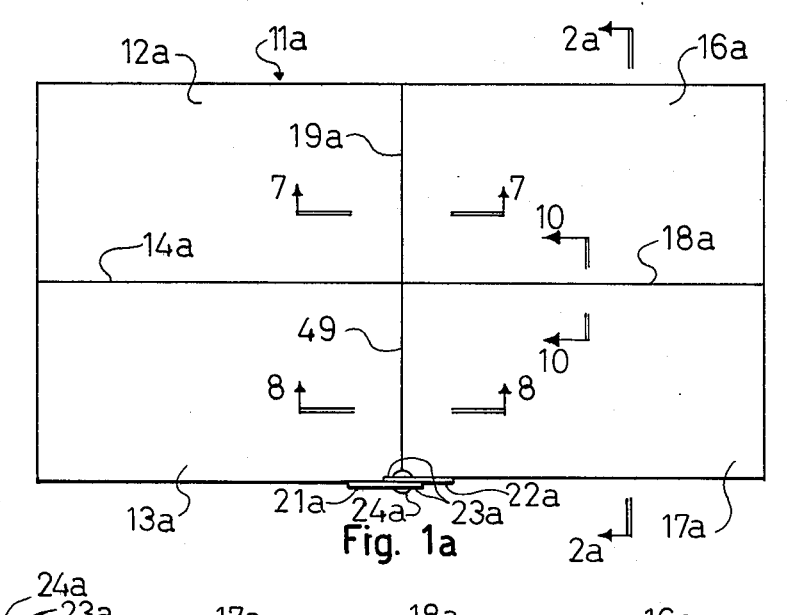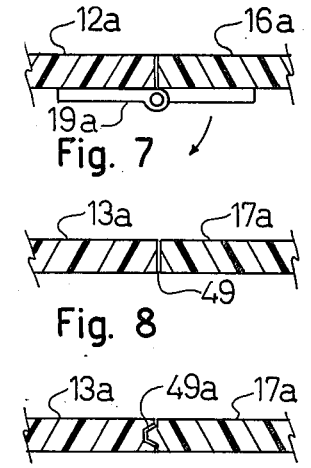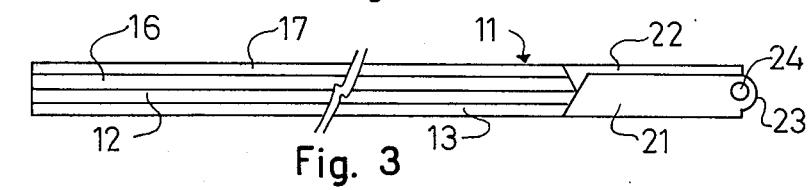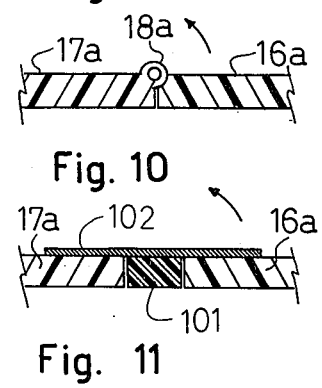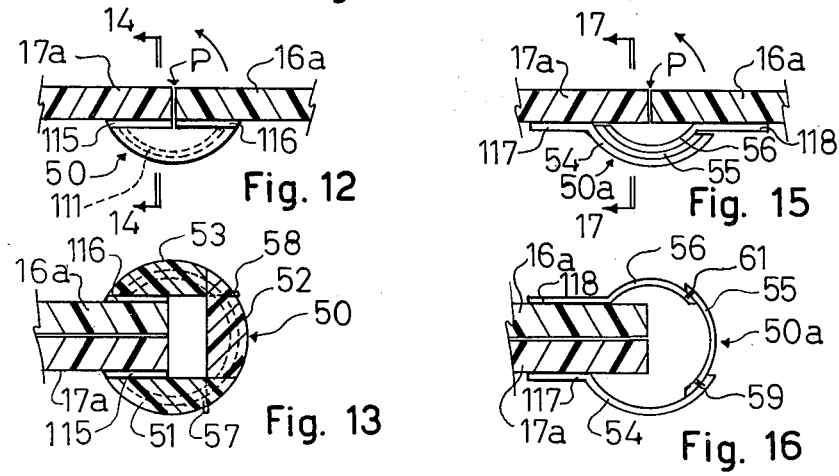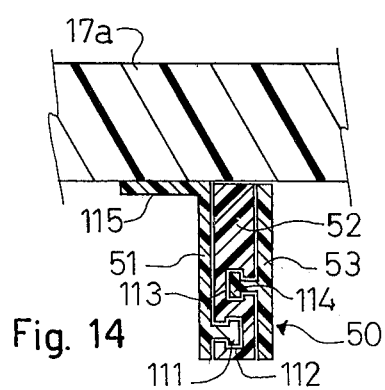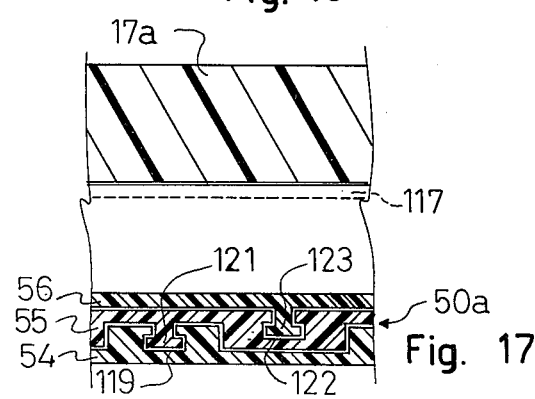

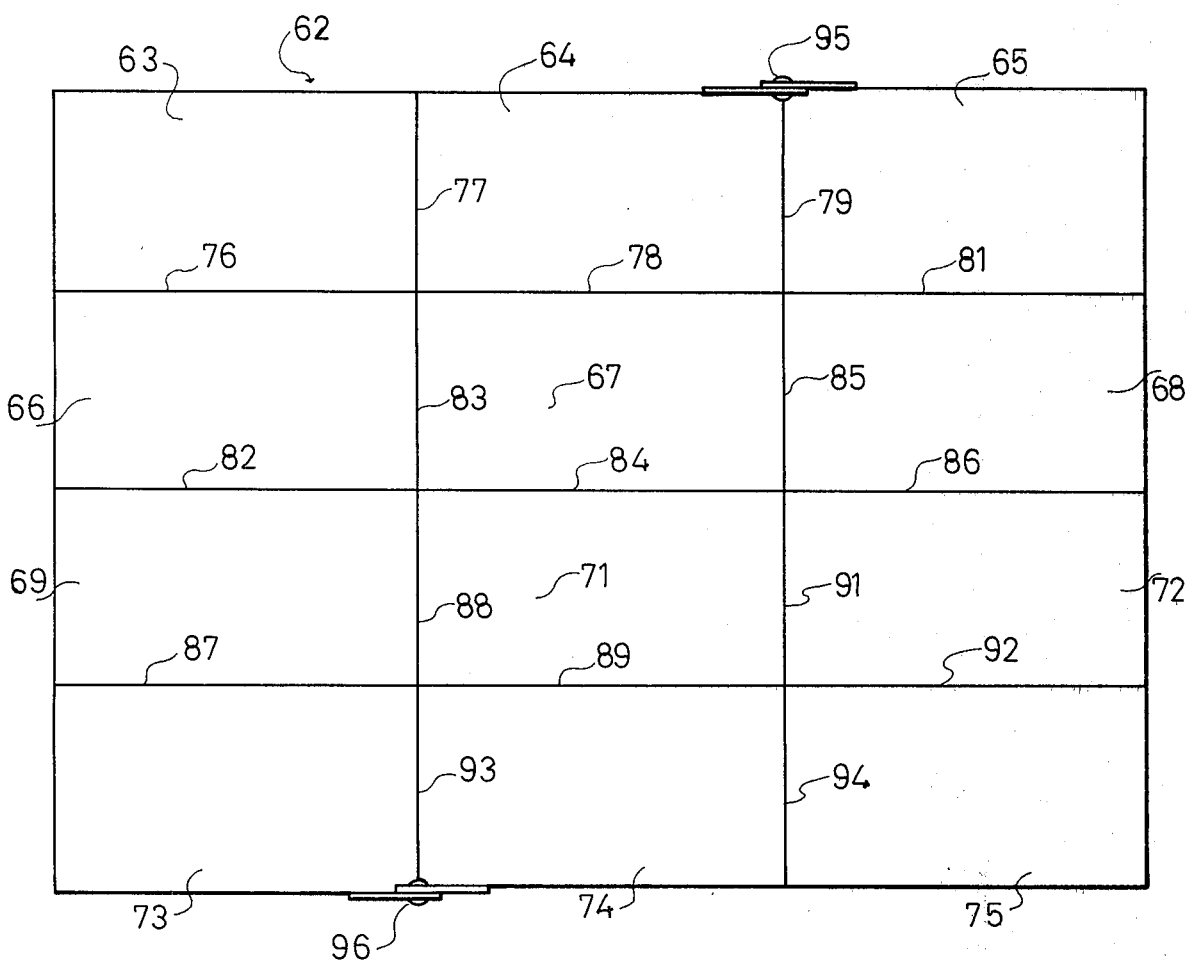
Fig. 18
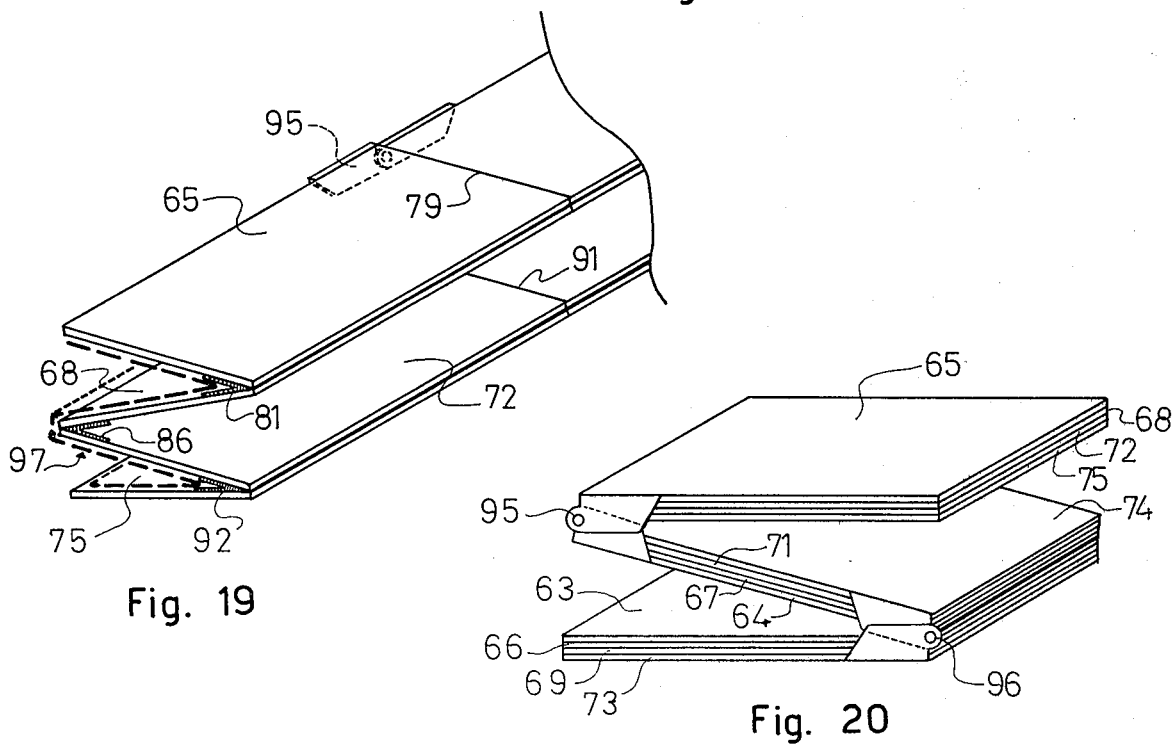
Fig. 19
Fig. 20

FOLDING BOARD FOR PAMPHLETS, MAPS AND THE LIKE

This is a continuation-in-part of co-pending application Ser. No. 06/170,136, filed July 18, 1980, now U.S. Pat. No. 4,360,346, issued Nov. 23, 1982.

This invention relates to a new and improved folding board for pamphlets, maps and the like or may be used by itself. Reference is made to said pending application and the same is incorporated herein by reference.

The present invention has the objects and advantages of the aforesaid pending application. In addition, it has a number of other objects and advantages.

A principal feature of the invention is the fact that it comprises a plurality of sections, each of which is relatively rigid and is hinged along one or more margins to adjacent sections. The various sections may be folded along the axes of the hinges which join them to adjacent sections for compactness. When unfolded, these sections are relatively rigid.

In the aforesaid pending application, the holder was adapted for use with folding maps preferably in the form of booklets. The present invention may be used with or without such booklets. If used without the booklets, maps or other graphic material may be applied directly to the boards as by printing or graphic material may be glued to the boards.

A further feature of the invention is the provision of a scale which may slide along the top or other margin of the board to assist in locating coordinates on the board. Such a sliding scale may, in accordance with the disclosure of this application, be telescopic or foldable.

Another feature of the invention is the provision of illuminating means along one or more edges of the board so as to facilitate reading the material on the board in the dark.

A still further feature of the invention, particularly useful when a map is applied to the holder, is a compass located on the board in a suitable location.

Thus the device of the present invention is usable not only for use in locating coordinates on a map, but for other uses where ability of expansion of the board in two dimensions is desirable. The present invention provides a rigid base dimensioned to accommodate sections of maps, reports and other graphic material.

Booklets may be fan-folded so that the back of the booklet is attached to one of the sections of the board, (such as by conventional means which attach booklets to book covers by means of pocket parts) and attaching other portions of the booklet to other sections of the holder. By folding and unfolding the holder, the maps or other material may be folded and unfolded accordingly.

The present invention also comprises novel hinge constructions to hold adjacent board sections in folding relation.

Other objects of the present invention will become apparent upon reading the following specification and referring to the accompanying drawings in which similar characters of reference represent corresponding parts in each of the several views.

In the drawings:

FIG. 1a is a view similar to FIG. 1 of a modification;

FIG. 2a is an enlarged vertical sectional view taken substantially along the line 2a—2a of FIG. 1a;

FIG. 3 is an enlarged end elevational view showing the device of FIG. 1 fully folded and also showing the device of FIG. 1a fully folded;

FIG. 7 is an enlarged fragmentary sectional view taken substantially along the line 7—7 of FIG. 1a showing use of a rigid hinge;

FIG. 8 is an enlarged fragmentary view taken substantially along the line 8—8 of FIG. 1a is showing a butt joint of adjoining sections;

FIG. 9 is a view similar to FIG. 8 showing a modified construction;

FIG. 10 is a sectional view taken substnatially along line 10—10 of FIG. 1a;

FIG. 11 is a view similar to FIG. 10 of still another modified construction;

FIG. 12 is a view similar to FIG. 10 of still another modified construction;

FIG. 13 is a fragmentary view showing the structure of FIG. 12 with the sections folded;

FIG. 14 is a sectional view along the line 14—14 of FIG. 12;

FIG. 15 is a view similar to FIG. 12 showing a modified hinge construction;

FIG. 16 is a fragmentary view showing the structure of FIG. 15 with the boards folded;

FIG. 17 is a fragmentary sectional view taken substantially along the line 17—17 of FIG. 15;

FIG. 18 is a view similar to FIG. 1a showing multiple foldable sections;

FIG. 19 is a fragmentary perspective view of a portion of the structure of FIG. 18 showing some of the sections in the act of being folded;

FIG. 20 is a perspective view of the structure of FIG. 19 showing the device immediately prior to full folding.

Figure 1:
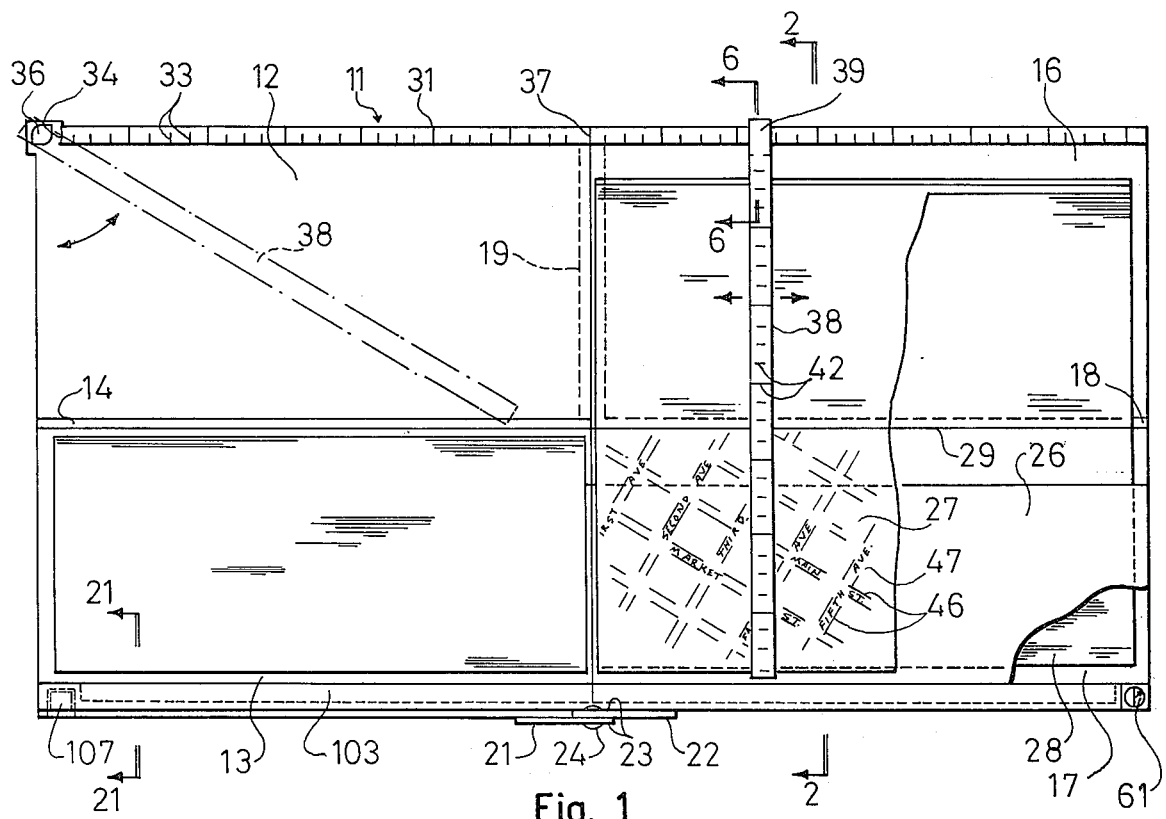
FIG. 1 is a top plan view of a map holder in accordance with the present invention, the right hand side of the holder being broken away in section to reveal the different layers.

Directing attention first to the structure of FIGS. 1, 2 and 3 through 6, inclusive, holder 11 is formed of four foldable sections. The top left section 12 is joined to the bottom left section 13 by a fabric horizontal hinge 14 so that the section 12 may be folded down over the section 13. Similarly, the top right section 16 is connected to the bottom right section 17 by similar fabric hinge 18. The top sections 12 and 16 are similarly formed with a fabric hinge 19.

The sections 13 and 17 are hinged together by means of left hinge plate 21 which is secured to the cover section 13 and right hinge plate 22 secured to section 17. The plates 21, 22 have overlapping arcuate ears 23 through which fit a hinge rivet 24. Thus, the sections may be folded downwardly and also from right to left of the position shown in FIG. 3.

Lower sections 13 and 17 are provided with pockets 26 which are flaps of paper or fabric secured to the cover sections in a well known manner. The faces of these pockets 26 may be printed with instructions for use of the device. An index of street names and coordinates for locating the same on the map may be printed on the map or may be separately provided. Map 27 is preferably in two sections; one on the left hand side of FIG. 1 and the other on the right hand side. The inner edges of the two sections abut as closely as possible. The back fold of the map is attached to a semi-rigid insert of material such as cardboard 28 shaped to fit into the pocket 26 and secure the map section 27 in place. Each section of the map 27 is formed with folds 29 in the manner of conventional maps.

Along the top edge of the holder 11 is a top scale 31 which is horizontally disposed and has in its top and bottom edges grooves 32. On the top face of scale 31 are markings 33 shown schematically in FIG. 1. The left end of scale 31 has a terminus 34 and a button 36 is spaced to the left of the terminus 34 for a purpose hereinafter described. In order to facilitate folding the holder, a split 37 is formed in the top scale 31 in alignment with the axis of the hinge rivet 24.

Vertical scale 38 is intended to slide along the horizontal scale 31. For its purpose, at its upper end it has a fitting 39 having inwardly turned flanges 41 which fit into the grooves 32 of the top scale 31. Markings for the two are displayed on the vertical scale as shown schematically in FIG. 1. It will thus be seen that the vertical scale 38 may be slid along the scale 31 and by reason of the closeness of fit of the flanges in grooves 32 and by force of gravity, the scale 38 is perpendicular to the scale 31.

Figure 5:
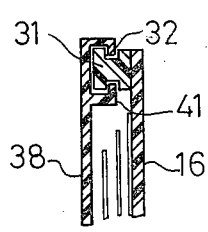
FIG. 5 is a sectional view taken along line 5—5 of FIG. 4.

Map 27 is selected depending upon the requirements of the user. As has previously been stated, preferably there are two sections to the map, one on the left and one on the right. The cardboard stiffener 28 or other means which is attached to the map 27 is inserted in the pocket 26, one on each side. Preparatory to folding the holder 11, scale 38 is slid to the left, as viewed in FIG. 1, until the inturned flanges 41 of the fitting 39 pass the terminus 34 (see FIG. 4) and fit around the button 36, as shown in FIG. 5. The vertical scale 38 may then be pivoted diagonally to the dot-and-dash position shown in FIG. 1. Thereupon, the top sections 12 and 16 may be folded down about the hinges 14 and 18 to overlie the bottom sections 13 and 17, respectively. Thereupon, the left and right sections may be folded together about the fabric hinge 19 and the hinge pin 24 to assume the completely folded position shown in FIG. 3.

When it is necessary to use the map, the map is unfolded in the reverse of the procedure heretofore described. The user seeking a street name consults the index for the particular map inserted in the holder, and from this index determines which particular map section is to be consulted, flipping the folds 29 of the map over until the particular map section is exposed. The index also gives a reading 33 on the top scale 31. The vertical scale is turned down from its diagonal position shown in FIG. 1 to a vertical position and pushed to the right so that the flanges 41 engage in the grooves 32 of the top scale 31. Scale 38 is pushed along the scale 31 until one of its edges (e.g., its right-hand edge) coincides with the index-indicated markings 33 on the scale 31. The user then reads on the scale 38 the proper marking 42 designating a street name as per the street name index printed on the lower right hand corner of the folder or elsewhere. The name "First St.", is printed on the map and listed in the index with coordinates for markings 33 and 42. The markings 33 and 42, as read on the index will give the location on scales 31 and 42 of the location where the word "First" is printed on the map with considerable accuracy and in a very short time.

It will be seen that the map sections may be flipped over conveniently to the proper location which is to be consulted and that by means of the markings 33 and 42 accurate location of street names may be found.

In the lower right hand corner of the holder 11 shown in FIG. 1 is a compass 61 which is fitted into, or attached to the holder by any suitable means. It will be understood that the location of the compass may be at any desired point. Particularly where maps are being read, a conveniently located compass is desirable.

Figure 21:
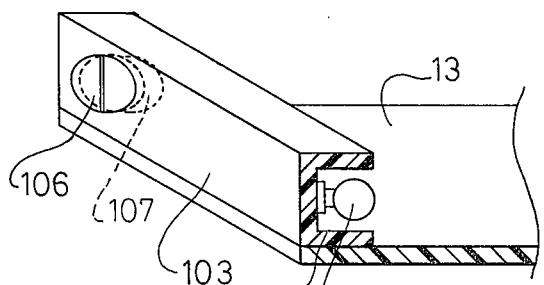
FIG. 21 is a fragmentary view taken substantially along the line 21—21 of FIG. 1.

Also shown in FIG. 1 is a casing 103 along the lower edge of the holder 11. As shown in FIG. 21, one or more bulbs 104 are fitted into groove 105 of casing 103 and suitably wired to a battery and switch (not shown) located at one end of the casing. The battery is removable and is held in place by threaded cap 106. The location of the light may be on any one or more edges of the board. The type of bulb may be incandescent or fluorescent.

Figure 22:
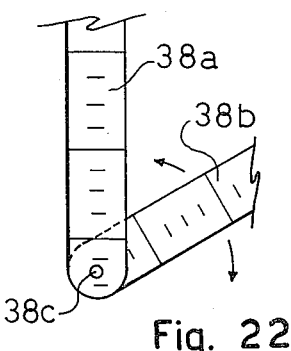
FIGS. 22 and 23 are fragmentary plan views of modified scales.
Figure 23:
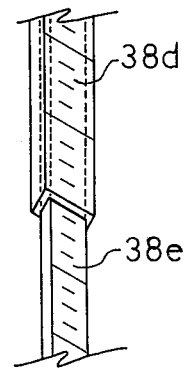
Figure 4:
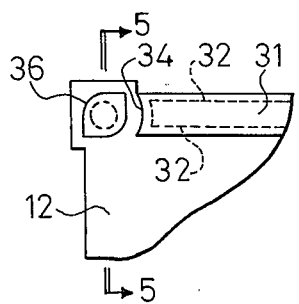
FIG. 4 is fragmentary detailed plan view of the upper left hand corner of FIG. 1.
Figure 6:
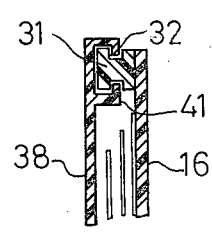
FIG. 6 is enlarged fragmentary sectional view taken substantially along the line 6—6 of FIG. 1.

The scale 38 shown in FIG. 1 is rigid. However, as shown in FIG. 22, to eliminate the necessity for the pivotal movement shown in dot and dash lines in FIG. 1, the scale may be formed in two or more sections 38a, 38b pivoted together about pivot rivet 38c. An alternate arrangement is shown in FIG. 23 where the scale sections 38d, 38e are telescopic. The modifications of FIGS. 22 and 23 are especially useful in the construction of FIG. 18.

Figure 2:
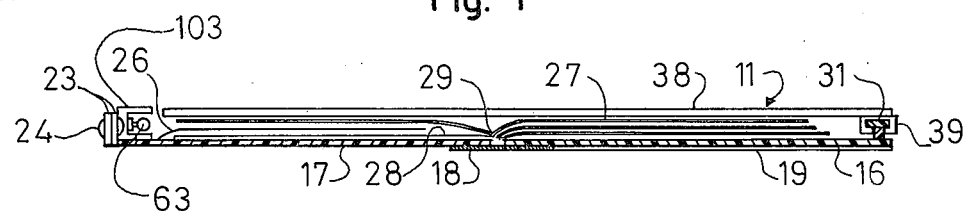
FIG. 2 is an enlarged vertical sectional view taken substantially along the line 2—2 of FIG. 1.

Directing attention now to the structure of FIGS. 1a, 2a, 3, 7 and 8, the board 11a is made up of four sections, 12a, 13a, 16a and 17a, and differs from the structure of FIGS. 1 and 2 in that graphic material (if used) is preferably applied directly to the surface of the various sections as by printing or by gluing paper thereto. In the forms shown in FIGS. 1a and 2a, hinge 14a, having a horizontal axis, joins sections 12a and 13a. Hinge 14a may be of fabric, or may be rigid. Section 12a may be folded down over section 13a about the horizontal axis of hinge 14a. The right top section 16a is connected to the bottom right section 17a by a hinge 18a similar to hinge 14a. Top sections 12a and 16a may be joined by a hinge 19a similar to hinge 14a, but in such manner that the section 16a is folded in back of (rather than in front of) the section 12a.

As in the preceding modification, the sections 13a and 17a are hinged together along the lower edge of the board 11a. Thus left hinge plate 12a is secured to section 13a and right hinge plate 22a secured to section 17a. Plates 21a and 22a have overlapping arcuate ears 23a through which fits hinge rivet 24a. The sections 13a and 17a abut along line 49. In the form of invention shown in FIG. 8, the sections adjoin in a simple butt joint. However, in the form of invention shown in FIG. 9, a tongue-and-groove joint is illustrated. The joint 49a provides a more rigid structure when the board is opened.

The structure of FIG. 1a is preferably first folded downwardly about the horizontal axis 14a–18a, with the section 12a on top of the section 13a and then about the vertical axis as in the preceding modification.

The hinges illustrated and described may be of any suitable material, such as fabric, or they may be rigid. They may be mounted on the face or on the back of the sections 12a, 13a, 16a, 17a, or the hinge portions 18a may be formed integrally with the board section as illustrated in FIG. 10. FIGS. 11, 12 and 15 illustrate other hinge constructions, hereinafter described in detail.

Each section may hold other material, such as a booklet, (not shown) there being a separate booklet for each vertical section. Where the material held is bulky, a hinge such as that shown in FIG. 11 may be used. A spacer strip 101 may be positioned between the inner edges of adjacent sections such as 16a, 17a. Fabric hinge 102 may be glued or otherwise attached to the section 12a, 101 and 16a. It will be understood that more elaborate hinges than the flat fabric hinge 102 may be substituted for the hinge shown in FIG. 11 such as those of FIGS. 7, 10, 12, or 15.

FIGS. 12–14 show a form of hinge suitable where an even surface is required when the board is fully unfolded and the projection of hinges on the face of the board is undesirable. The hinge 50 shown in FIG. 12 rotates inwardly. The hinge 50 is formed of three sectors 51, 52 and 53. Sector 51 is attached to section 17a by means of flange 115. This sector has a tongue-shaped fitting 111 which fits into grooves 112 of sector 52. Sector 53 is attached to section 16a by means of flange 116. Sector 53 has a tongue-shaped fitting 114 which projects into the grooves 113. The various sectors are concentric with center P shown in FIG. 12. Thus, the sectors may slide relative to each other about the axis P. Stops 57 and 58 are pins which limit rotation. Although three sectors are illustrated and shown in FIGS. 12–14, fewer or more sectors may be required.

FIGS. 15–17 illustrate a cylindrical type hinge 50a. This hinge is formed of three sectors of cylinders, 54, 55, 56. Sector 54 is attached to section 17a by flange 117. Sector 54 has grooves 119 in which the tongue-shaped fitting 121 of sector 55 fits. Sector 56 is attached to section 16a by means of flange 118. Sector 56 has a tongue-shaped fitting 123 which fits into grooves 122 of sector 55. The sectors are concentric and rotate about the center P shown in FIG. 15. The various sectors slide along each other around the axis P. Stops 59 and 61 limit rotation. It is possible to have only two sectors instead of three, or to have more than three sectors, depending upon whether a smaller or larger angle of rotation is desired. The sectors may have plural tongue and groove fitting shapes proportionate to the length of the hinge, in order to provide superior operation.

Directing attention now to the structure shown in FIG. 18, the holder 62 is formed of twelve sections, there being four horizontal rows and three vertical rows. This arrangement is merely illustrative of principle that expansion in two different directions—horizontal and vertical—by adding sections as required may be accomplished.

The top sections 63, 64 and 65 are joined to the next lower sections 66, 67 and 68, respectively, by horizontal hinges 76, 78, 81, respectively. These hinges may be similar to hinge 18a of FIG. 1a. Accordingly, the three top sections may be folded down over the next three sections.

Similarly, sections, 66, 67 and 68 are joined to the third tier of sections 69, 71 and 72, respectively, by horizontal hinges 82, 84, 86. The latter hinges also may be similar to hinge 18a of FIG. 1a, except that the hinge 18a of FIG. 1a accommodates inward folding. The hinges 82, 84, 86 accommodate outward folding.

The sections 69, 71, 72 are joined to the bottom sections 73, 74, 75, respectively, by horizontal hinges 87, 89, 92, similar to hinge 18a of FIG. 11. By alternating the direction of folding of the hinges, the various sections may be folded in a fan-fold shown in FIG. 19.

The vertical row joints may be as shown in FIG. 20. Thus, the top left section 63 is joined to section 64 by hinge 77 which is similar to hinge 19a of FIG. 1a. The lower left section 73 is hinged to section 74 by means of a pivot hinge 96 similar to the combination of hinges 21a, 22a, 23a, 24a of FIG. 1a. The three sections 66, 69 and 73 are detached from their adjacent sections 67, 71 74, along the lines 83, 88, 93. They may butt each other similar to FIG. 8, or join along tongue and groove joints similar to that shown in FIG. 9.

Bottom section 74 is joined to section 75 by hinge 94 similar to hinge 19a of FIG. 1a.

Top section 64 is preferably joined to section 65 by means of a pivot hinge 95 similar to the hinge 96. Sections 64, 67, 71 are not attached to sections 65, 68, 72, but butt against each other along lines 79, 85 and 91 with a butt joint similar to that shown in FIG. 8, or a tongue and groove joint similar to that shown in FIG. 9.

Thus the sections may be folded downwardly in the first operation shown in FIG. 19, as has already been described and then folded from right to left (or left to right) as shown in FIG. 20.

If, instead of having even horizontal rows as shown in FIG. 18, an odd number of rows were required then the rotation of the pivot hinges alternately should be toward the inside and the outside.

If booklets or similar matter of a bulky nature is required, then hinges similar to that shown in FIG. 11 may be employed.

What is claimed is:

1. A folding board comprising at least four rectangular sections, first hinge means connecting a first and second said section along a first line, said first hinge means being of a type to permit front faces of said first and second sections to fit flat against each other in folded position, second hinge means connecting a third and a fourth said section along a second line which is an extension of said first line, said second hinge means being of a type to permit front faces of said third and fourth sections to fit flat against each other in folded position, third hinge means connecting said first and third sections together along a third line transverse a said first and second lines and intersecting the junction of said first and second lines, said third hinge means being of a type to permit the back faces of said first and third sections to fit against each other, and fourth hinge means connecting said second and fourth sections along a fourth line which is an extension of said third line, said fourth hinge means having a hinge axis spaced above the plane of said second and fourth sections a distance at least twice the thickness of said board.

2. A board according to claim 1 in which said fourth hinge means comprises a first hinge piece having a first flange fixed to said second section, a first plate connected to said first flange and having a first ear, a second hinge piece having a second flange fixed to said fourth section, a second plate connected to said second flange and having a second ear overlapping said first ear and a hinge pin on said hinge axis pivotally attaching said first and second ears.

3. A board according to claim 1 in which said third hinge means comprises three members each approximately semicircular in end elevation, means attaching a first member fixed to said first section, means attaching a second member fixed to said second section, said third member being intermediate said first and second members and having two opposite faces, each formed with arcuate grooves having centers on said hinge axis, said first and second members having tongues fitting into said grooves.

4. A board according to claim 1 in which said third hinge means comprises three hollow cylindrical members, means attaching a first said member fixed to said first section, means attaching a second said member fixed to said second section, a third said member underlying said first member and overlapping said second member, said sectors having a common axis on said hinge axis.

5. A board according to claim 4 which further comprises stops on said member to limit relative rotation of said members.

6. A board according to claim 1 in which said third hinge means comprises a spacer strip interposed beween said third and fourth sections and fifth hinge means joining said second section to said spacer strip and said third section to said spacer strip.

7. A board according to claim 1 in which said first, second and third hinge means each comprise fabric and adhesive securing said fabric to the sections underlying said fabric.

8. A board according to claim 1 in which said first and second sections join in a butt joint and said first hinge means comprises a leaf hinge having plates fixed to said first and second sections, each plate formed with a hole to receive a hinge pin.

9. A board according to claim 8 in which said leaves are molded integral with respective sections to which they are fixed.

10. A board according to claim 1 in which the edge of said second section adjacent said fourth section is formed with a groove and an edge of said fourth section is formed with a tongue mating in said groove when said board is opened.

11. A board according to claim 1 which further comprises graphic material on said sections, a channel along one edge of said board formed with a hinge, lamps in said channel and means for illuninating said lamps, said channel directing light from said lamps to illuminate said graphic material.

12. A board according to claim 11 in which said graphic material is a map and which further comprises a compass in said board oriented with direction of said map.

13. A board according to claim 11 in which said graphic material is a map and which further comprises a first scale fixed along one edge of said map, said scale being hinged and a second scale slidable along said first scale and disposed at right angles to said first scale, said second scale being formed to reduce in length to a maximum no longer than the length of one said section.

14. A board according to claim 13 in which said second scale is hinged midway of its length.

15. A board according to claim 13 in which said second scale is formed of two parts telescopically slidable relative to each other.

16. A board according to claim 1 in which said board comprises in excess of four sections, adjacent sections in a vertical row being joined to next lower sections by horizontal hinge means similar to said first hinge means and alternating for forward and back folding, adjacent sections in horizontal tiers being joined to the next section by vertical hinge means and alternating for forward and back folding, the endmost two sections diagonally opposite said second and fourth sections being joined by fifth hinge means similar to said fourth hinge means.

* * * * *